United States Patent [19]

Helmond

[11] Patent Number: 5,731,390

[45] Date of Patent: Mar. 24, 1998

[54] HYDROLYTIC STABLE GLASS FIBER REINFORCED POLYESTER RESINS

[75] Inventor: Johannes van Helmond, Bergen op Zoom, Netherlands

[73] Assignee: General Electric Company, Pittsfield, Mass.

[21] Appl. No.: 434,132

[22] Filed: May 2, 1995

[30] Foreign Application Priority Data

Nov. 19, 1994 [EP] European Pat. Off. ............ 94118257

[51] Int. Cl.$^6$ ..................................................... C08F 20/00
[52] U.S. Cl. .................... 525/438; 525/437; 525/438; 525/442; 525/444; 525/445; 524/81; 524/174; 524/442
[58] Field of Search ......................... 525/437, 438, 525/442, 444, 445; 524/442, 174, 81

[56] References Cited

U.S. PATENT DOCUMENTS

| | | |
|---|---|---|
| 4,020,122 | 4/1977 | Borman et al. ..................... 525/438 |
| 4,933,429 | 6/1990 | McCracken et al. ................. 528/272 |

FOREIGN PATENT DOCUMENTS

| | | |
|---|---|---|
| 0 097 870 | 11/1984 | European Pat. Off. . |
| 0 387 565 | 9/1990 | European Pat. Off. . |
| 0 449 135 a1 | 10/1991 | European Pat. Off. . |
| 0 523 933 A1 | 1/1993 | European Pat. Off. . |
| 2 033 403 | 5/1980 | United Kingdom . |
| 93/04125 | 3/1993 | WIPO . |

*Primary Examiner*—Samuel A. Acquah

[57] ABSTRACT

A thermoplastic resin composition having improved hydrolytic stability having in admixture a saturated polyester resin such as polybutylene terephthalate, an epoxy novolac, a glass fiber reinforcing filler and a catalyst such as sodium stearate.

9 Claims, No Drawings

HYDROLYTIC STABLE GLASS FIBER REINFORCED POLYESTER RESINS

BACKGROUND OF THE INVENTION

This invention relates to a particular polyester resin composition. More particularly, the present invention relates to a polyester resin composition having improved hydrolytic stability which composition has in admixture a polyester resin, a glass reinforcing agent and a particular epoxy resin, namely an epoxy novolac.

Polyester compositions having in admixture polyesters, various fillers and epoxy resins are known in the art. Such compositions are used in the preparation of articles by forming methods such as injection molding, blow molding, profile extrusion and thermoforming. However, one of the problems with polyester resins is the lack of hydrolytic stability. Various methods have been developed over the years for improving the hydrolytic stability of the polyesters.

Borman et al., U.S. Pat. No. 4,020,122, describes a method to increase the melt elasticity or viscosity of linear high molecular weight polyesters by adding to the polyester organic polyepoxides having at least two epoxide groups per molecule. The polyepoxide can be an epoxylated novolacs. However, the patent broadly discloses adding such materials as reinforcing agents without disclosing any specific agents.

McCracken et al, U.S. Pat. No. 4,933,429, teaches the production of high melt viscosity branched polyesters. The disclosed branched polyesters are produced by effecting a reaction between (A) a polyester having a substantial portion of free carboxylic groups, (B) a polyepoxy compound, preferably having at least three epoxy functionalities, particularly triglycidyl isocyanurate, and (C) a catalyst selected from salts of aliphatic carboxylic acids and primary alkylamines. The patent makes no mention of adding fillers or reinforcing agents.

Borman et al., U.S. Pat. No. 3,886,104, teaches stabilizing high molecular weight polyester resins by adding to the polyester resin a stabilizer comprising an internally polyfunctional epoxide having at least two epoxide functionalities. The epoxide containing stabilizers disclosed to be useful are epoxidized polyunsaturated triglycerides. The patent also discloses employing reinforcing agents such as glass fibers.

European Patent Application EP0523933A1 discloses using epoxy resins with a polyester and barium sulfate. An epoxy novolac is included among the various epoxy resins disclosed and shows somewhat of an increase in hydrolytic stability, but only after exposure in an autoclave for 17 hours.

Surprisingly, it has now been found that compositions comprising linear polyesters, one or more particular epoxide compounds and glass reinforcing fibers provides a composition having greatly improved hydrolytic stability.

SUMMARY OF THE INVENTION

According to the present invention there is provided a thermoplastic resin composition comprising (a) a high molecular weight polyester resin, (b) an epoxy novolac, (c) glass fiber reinforcing filler, and (d) sodium-stearate catalyst.

Preferably the polyester component (a) is selected from the group consisting of poly(1,4-butylene tereph-thalate), poly(ethylene terephthalate), poly(1,4-cyclohexandedimethanol terephthalate) and blends of any of the foregoing, and is present in an amount ranging from about 15 to about 80 weight percent based on the weight of the total composition.

The preferred epoxy compound is an ortho cresol novolac epoxy resin. The preferred catalyst compounds are salts of an aliphatic carboxylic acid such as sodium stearate.

DETAILED DESCRIPTION OF THE PRESENT INVENTION

The high molecular weight polyesters employed in the practice of the present invention are derived from an aliphatic or cycloalyphatic diol or mixtures thereof, containing 2 or more carbon atoms and at least one aromatic dicarboxylic acid. The polyester which are utilized herein are available commercially or can be prepared by known techniques, such as by the alcoholysis of esters of the phthalic acid or combination of phthalic acids with an aliphatic diol and subsequent polymerization, by heating the diol with the free acids or with halide derivatives thereof, and similar processes. These are described in U.S. Pat. Nos. 2,465,319 and 3,047,539, and elsewhere.

One class of preferred polyesters employed in the practice of this invention will be of the family consisting of high molecular weight, polymeric aliphatic terephthalates and/or isophthalates having repeating units of the general formula:

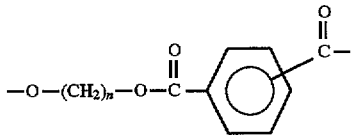

wherein n is a whole number of from two to six, and mixtures of such esters, including copolyesters of terephthalic and isophthalic acids of up to about 30 mole percent of isophthalic units.

Especially preferred polyesters are poly(ethylene terephthalate) and poly(1,4-butylene terephthalate).

Illustratively, high molecular weight polyesters will have an intrinsic viscosity of at least about 0.4 deciliters/gram and, preferably, at least about 0.7 deciliters/gram as measured in a 60:40 phenol tetrach-lorethane mixture at 30° C. At intrinsic viscosities of at least about 1:1 deciliters/gram, there is a further enhancement in toughness of the present compositions.

Also included within the scope of the present invention with respect to the high molecular weight linear polyesters are combinations of polybutylene terephthalates and polyethylene terephthalates. The combinations may be blends thereof, or blends of copolymers of polybutylene terephthalate and polyethylene terephthalate with homopolymers of polybutylene terephthalate and homopolymers of polyethylene terephthalate, or copolymers of the two polyesters. The preferred combination is a blend of polybutylene terephthalate and polyethylene terephthalate. Although during extrusion of the blend of the two polyesters, some copolymer may be formed, probably in the range of about 5 weight percent range. Normally, a phosphorous stabilizer is added, particularly a phosphite, in order to inhibit the formation of the copolymer of polybutylene terephthalate and the polyethylene terephthalate. In the blends thereof, the composition will generally consist essentially of about 30 to 70 and preferably 40 to 60 parts by weight of the polybutylene terephthalate and correspondingly about 30 to 70 parts and preferably about 60 to 40 parts by weight of the polyethylene terephthalate, the parts by weight being based on the total weight of the polybutylene terephthalate and polyethylene terephthalate.

Also contemplated herein are the above polyesters with minor amounts, e.g., from 0.5 to about 2 percent by weight, of units derived from aliphatic acids and/or aliphatic polyols, to form copolyesters. The aliphatic polyols include glycols such as poly(ethylene glycol). These can be made following the teachings of, for example, U.S. Pat. Nos. 2,465,319 and 3,047,539.

Among the units which can be present in the copolyesters are those derived from aliphatic dicarboxylic acids, e.g., of up to and above about 50 carbon atoms, including cycloaliphatic straight and branched chain acids, such as adipic acid, cyclohexanediacetic acid, dimerized $C_{16}$-$C_{18}$ unsaturated acids (which have 32 to 36 carbon atoms), trimerized acids, and the like.

Another preferred class of polyesters employed in the present invention are derived from a cycloaliphatic diol and an aromatic dicarboxylic acid prepared by condensing either the cis- or trans-isomer (or mixtures thereof) of, for example, 1,4-cyclohexanedimethanol with the aromatic dicarboxylic acid so as to produce a polyester having recurring units having the following formula:

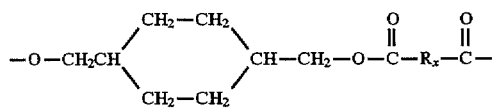

wherein the 1,4-cyclohexane dimethanol is selected from the cis- and trans-isomers thereof and $R_x$ represents an aryl radical containing 6 to 20 carbon atoms and which is the decarboxylated residue derived from an aromatic dicarboxylic acid.

Examples of aromatic dicarboxylic acids indicated by $R_x$ in the formula above include isophthalic or tere-phthalic acid, 1,2-di(p-carboxyphenyl)ethane, 4,4'dicarboxydiphenyl ether, etc., and mixtures of these. All of these acids contain at least one aromatic nucleus. Fused rings can also be present such as in 1,4 or 1,5 naphthalenedicarboxylic acids. The preferred dicarboxylic acid is terephthalic acid or mixtures of terephthalic and isophthalic acid.

Another preferred polyester may be derived from the reaction of either the cis- or trans-isomer (or a mixture thereof) of 1,4-cyclohexanedimethanol with a mixture of iso- and terephthalic acids. These polyesters have repeating units of the formula:

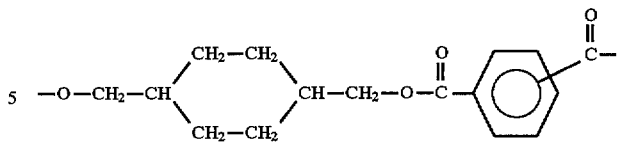

Still another preferred polyester is a copolyester derived from a cyclohexanedimethanol, an alkylene glycol and an aromatic dicarboxylic acid. These copolyesters are prepared by condensing either the cis- or trans-isomer (or mixtures thereof) of, for example, 1,4-cyclo-hexanedimethanol and an alkylene glycol with an aromatic dicarboxylic acid so as to produce a copolyester having repeating units of the following formula:

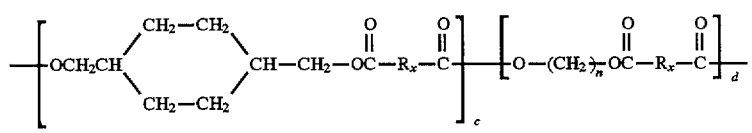

wherein the 1,4-cyclohexanedimethanol is selected from the cis- and trans-isomers thereof, $R_x$ is a previously defined, n is an integer of 2 to 6, the c units comprise from about 10 to about 90 percent by weight, and the d units comprise from about 10 to about 90 percent by weight.

The preferred copolyester may be derived from the reaction of either the cis- or trans-isomer (or mixtures thereof) of 1,4-cyclohexanedimethanol and ethylene glycol with terephthalic acid in, for example, a molar ratio of 1:2:3. These copolyesters have repeating units of the following formula:

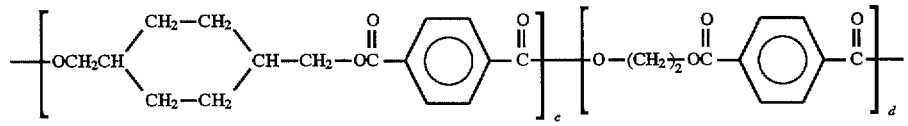

wherein c and d are as previously defined.

Also contemplated are polymers in which at least a portion of the monomers comprise soft segment radicals such as poly(oxyethylene) or poly(oxybutylene). Such polymers may be prepared by incorporating compounds such as polyethylene glycol, caprolactone or dicarboxylic acids containing polyoxyalkylene segments in the polymerization reaction, and are typically elastomeric. Illustrative polymers of this type are available from DuPont and General Electric under the trade names HYTREL® and LOMOD®, respectively.

The polyesters as described herein are either commercially available or can be produced by methods well known in the art such as those set forth in, for example, U.S. Pat. No. 2,901,466.

The preferred cycloaliphatic polyesters are poly(1,4-cyclohexanedimethanol tere/iso-phthalate) and a copolyester of 1,4-cyclohexanedimethanol, ethylene glycol and terephthalic acid and poly(ethylene terephthalate) as previously described.

The polyesters used herein have an intrinsic viscosity of at least about 0.4 and may be as high as about 2.0 dl/g. measured in a 60:40 phenol/tetrachloroethane mixture of similar solvent at 23°–30° C.

The polyester resin component can vary widely in amount. Preferably the polyester resin component is present in an amount ranging from about 15 to about 80 weight percent based on the total weight of the composition. More preferably the polyester resin component is present in an amount ranging from about 30 to about 70 weight percent based on the total weight of the composition. Where a blend of poly(ethylene terephthalate) and poly(1,4-butylene terephthalate) is employed, the polyester resin component will comprise from about 1 to about 99 parts by weight poly(ethylene terephthalate) and from about 99 to about 1 part by weight poly(1,4-butylene terephthalate) based on 100 parts by weight of the poly(ethylene terephthalate) and poly(1,4-butylene terephthalate) combined. However, other polyester blends are also contemplated within the scope of the present invention.

The epoxy compound employed herein is an epoxylated novolac. These may be epoxy ortho cresol novolac resins commonly referred to as ECN (epoxy cresol novolac) resin or epoxy para cresol novolac resins or epoxy phenol novolac resins or mixtures thereof. Preferably the compound will contain only carbon, hydrogen and oxygen. The ECN resins are obtained by reacting O- cresol novolac with epichlorohydrin generally at ratios of less than unity. Epoxidation is obtained with an excess of epichlorohydrin. This resin generally contains more than two epoxy groups per molecule and this can be described as multifunctional epoxy resins. The epoxy novolac resins of this invention will have a molecular weight of about 500 to about 5000, and preferably about 500 to about 1000 in order to facilitate blending with the polyester resin. The preferred epoxy novolac resin employed in the practice of this invention is an epoxy ortho cresol novolac resin which during the synthesis thereof may have some para cresol present.

The ECN may be employed in any effective amount to produce improved hydrolytic stability but preferably amounts employed range from about 0.1 to about 30 percent by weight. However, particularly preferred range is from about 0.01 to about 30 percent by weight. Within this particularly preferred range, it has been found advantageously to employ about 1 to about 15 percent by weight of ECN and most preferably about 1 to about 5 percent by weight. All percentages, unless otherwise stated, are based on the combined weights of the component parts of the composition of this invention.

The reinforcing filler employed in the practice of this invention is glass fillers. Preferably the glass fillers are in the form of filamentous glass fibers or glass flakes. These are well known to those skilled in the art and are widely available from a number of manufacturers. For compositions ultimately employed for electrical uses, it is preferred to use fibrous glass filaments comprised of lime-aluminum borosilicate glass that is relatively sodium free. This is known as "E" glass. However, other glass compositions are useful. Especially preferred are K filament glass (about 14 micron diameter), G filament glass (about 10 micron diameter) and D filament glass (about 7 micron diameter). All such glasses are contemplated as within the scope of the present invention. The filaments are made by standard processes, e.g., by steam or air blowing, flame blowing and mechanical pulling. The preferred filaments for plastics reinforcement are made by mechanical pulling. The filament diameters preferably range from about 3 micron to about 20 micron, but this is not critical to the present invention. It is known, however, to those skilled in the art, that smaller filament diameters will also increase the strength of plastics treated therewith.

The length of the glass filaments and whether or not they are bundled into fibers and the fibers bundled in turn to yarns, ropes or rovings, or woven into mats, and the like are also not critical to the invention. However, in preparing the molding compositions of the present invention, it is convenient to use filamentous glass in the form of chopped strands of from about 3 mm to about 50 mm long. In articles molded from the compositions, on the other hand, even shorter lengths will be encountered because, during compounding, considerable fragmentation will occur. The glass fibers can be present in amounts ranging from about 5 percent by weight to about 50 percent by weight and preferably 10 to about 30 percent by weight.

The catalyst employed in this invention, preferably, are salts free from direct carbon-phosphorous bonds and containing at least one of alkali metal cations and alkaline earth metal cations and halide anions. It is apparent that this class contains a large number of compounds. They include alkali metal halides, alkali metal carboxylates, alkali metal enolates, amine hydrohalides, alkali metal carbonates and quaternary ammonium halides. Illustrative compounds within this class are lithium fluoride, lithium iodide, potassium bromide, potassium iodide, sodium dihydrogen phosphate, sodium acetate, sodium benzoate, sodium caproate, sodium stearate, sodium ascorbate and dodecyltrimethylammonium bromide.

Salts of aliphatic carboxylic acids containing at least about 18 carbon atoms, especially the alkali metal stearates and preferably sodium stearate, have certain advantages over the other catalysts employed according to the invention and are therefore often preferred. In the first place, their use permits extrusion of the polyester-difunctional epoxide composition at substantially higher feed rates than those which are effective in their absence. In the second place, they impart substantially less odor to the composition than certain other compounds useful as catalysts, especially amines.

The catalyst component can be present in the composition of the present invention in any effective amount. Preferably the catalyst is present in an amount ranging from about 0.01 to about 5.0 weight percent, more preferably from about 0.03 to about 0.1 weight percent based on the total weight of the resin composition.

The compositions of the present invention can also comprise any number of conventional additives, such as dyes, pigments, stabilizers, plasticizers, reinforcers, flame retardants, drip retardants, nucleants, rubbery impact modifiers and the like. These are added, as desired, for their conventionally employed purposes. Illustrative flame retardant additives are disclosed in U.S. Pat. Nos. 3,833,685; 3,342,254; 3,915,926 and 3,671,487. Other flame retardants are disclosed in U.S. Pat. Nos. 3,681,281; 3,557,053; 3,830, 771 and United Kingdom Patent No. 1,358,080.

Generally speaking, the more important of the flame retardant compounds contain chemical elements employed for their ability to impart flame resistance, e.g., bromine, chlorine, antimony, phosphorous and nitrogen. It is preferred that the flame-retardant additive comprise a halogenated organic compound (brominated or chlorinated); a halogenated-containing organic compound in admixture with a phosphorous compound or compounds containing phosphorous-nitrogen bonds or a mixture of two or more of the foregoing.

The amount of flame retardant additive used is not critical to the present invention, so long as it is present in minor proportion based on said composition since major proportions may detract from physical properties, but should be at least sufficient to render the polyester resin non-burning or self-extinguishing. Those skilled in the art are well aware that the amount will vary with the nature of the resin and with the efficiency of the additive. In general, however, the amount of the additive will be from 0.5 to 50 parts by weight per 100 parts of resin.

A preferred range of the flame retardant will be from about 3 to about 25 parts and an especially preferred range will be from about 8 to about 12 parts per 100 parts of resin. Smaller amounts of compounds highly concentrated in the elements responsible for flame-retardance will be sufficient, e.g., elemental red phosphorous will be preferred at 0.5 to 2.0 parts by weight per hundred parts of resin, while phosphorous in the form of triphenyl phosphate will be used at 25 parts of phosphate per 100 parts of resin, and so forth. Halogenated aromatics will be used at 8 to 12 parts and synergists, e.g., antimony oxide, will be used at about 2 to about 5 parts by weight per 100 parts by weight of resin.

The compositions of the present invention may also comprise a drip retardant agent. These are described in U.S. Pat. No. 3,671,487. Generally, the drip retardant agent comprises a polytetrafluoroethylene resin, which is commercially available or can be prepared by known processes. They are white solids which can be obtained by polymerization of the tetrafluoroethylene in aqueous media with free radical catalysts, e.g., sodium, potassium or ammonium peroxydisulfates at evaluated pressure and at 0°–200° C. and preferably 20°–100° C. See, Brubaker, U.S. Pat. No. 2,393,967.

The process of this invention can be carried out by a number of procedures. In one way, the epoxide compound ECN is put into an extrusion compounder with the dry polyester, glass filler and catalyst compound, and the blend is heated at an elevated temperature, e.g., 230° C.–290° C., and extruded to produce molding pellets. The epoxide compound ECN is dispersed in the polyester resin, glass filler and catalyst, and the melt viscosity is elevated in the process. In another procedure, the epoxide compound ECN is mixed with the polyester resin, glass filler and catalyst blending at ordinary temperatures, then the blend is fluxed on a mill, heated, e.g., at 230°–290° C., cooled and chopped. The epoxide compound ECN can also be mixed with the powdered or granular polyester, glass filler and the catalyst, and the mixture can be heated and directly formed into molded items using machines which compound and mold. In still another procedure, the epoxy compound may be incorporated in the final stage of the polyester resin manufacture process.

In preferred embodiments of the present invention, the glass filler is not added to the composition until after the polyester, epoxide compound ECN and catalyst have been compounded. This can effectively be carried out by compounding the polyester, epoxide compound ECN and catalyst in a first extruder, and then further compounding the extrudate with the glass filler in a second extruder. Alternatively, the compounding may be carried out in a extruder by adding the polyester, epoxide compound ECN and catalyst in an upstream feedport of the extruder, and then adding the glass filler to a downstream feedport of the extruder. Compounding should be carried out to ensure that the temperature is carefully controlled; and is preferably maintained below about 275° C. Preferably the compounding is continued until an intimate blend between the resin, glass filler, the catalyst and epoxide compound is obtained.

The other above-mentioned additives can be added during compounding to impart on the blend the desired characteristics, as shown to those skilled in the art.

DESCRIPTION OF THE PREFERRED EMBODIMENTS

The following specific examples illustrate the present invention. However, they are not to be construed as limiting the invention in any manner whatsoever.

EXAMPLE 1

Polyester compositions were prepared by tumble blending the respective ingredients and compounded in a double-screw extruder, adjusted at an average temperature of 240° C., extruded and chopped up to pellets. After drying at 120° C. for 2 hours, the pellets were injected molded into test specimens using a 250°–265° C. barrel set temperature.

For comparative purposes, samples were also prepared with another epoxy material. The compositions (in percent by weight) and the results obtained are shown in Table 1 below. The results clearly show the vast improvement in hydrolytic stability of the compositions of this invention.

TABLE 1

|  | Examples | | | |
|---|---|---|---|---|
| Composition | 1 | 2 | 3 | 4 |
| PBT | 59.15 | 57.1 | 57.2 | 57 |
| ERL 4221 | 0 | 2 | 0 | 0 |
| Napthyl-glycidyl ether | 0 | 0 | 1.9 | 0 |
| ECN | 0 | 0 | 0 | 2.1 |
| Sodium Stearate |  | 0.05 | 0.05 | 0.05 |
| Stabilizer | 0.35 | 0.35 | 0.35 | 0.35 |
| Impact Modifier -1 | 7.5 | 7.5 | 7.5 | 7.5 |
| Impact Modifier -2 | 3 | 3 | 3 | 3 |
| Glass Fiber | 30 | 30 | 30 | 30 |

PBT - polybutylene terephthalate having a weight average molecular weight of about 63,000
ERL4221 - 3,4-epoxycyclohexylmethyl-3,4-epoxy-cyclohexyl carloxylate, Union Carbide Company
ECN - epoxy ortho cresol novolac
Stablizer - hindered phenol/phosphite/sulfide antioxideant mixture
Impact Modifier-1 - a styrene (ethylene-butylene) styrene triblock copolyer
Impact Modifier-2 - a Ethylene-Glycidyl methacrylate - Methyl acrylate terpolymer

TABLE 2

|  | Examples | | | |
|---|---|---|---|---|
| Test Results | 1 | 2 | 3 | 4 |
| Tensile Strength (MPa) | | | | |
| as molded | 119 | 111 | 104 | 117 |
| after 50 hrs ATC | 99 | 50 | 68 | 100 |
| after 100 hrs ATC | 56 | 43 | 63 | 98 |
| after 150 hrs ATC | 34 | 45 | 60 | 89 |
| Izod Impact (kJ/m$^2$) | | | | |
| as molded | 59 | 64 | 65 | 55 |
| after 50 hrs ATC | 42 | 13 | 21 | 41 |
| after 100 hrs ATC | 10 | 12 | 20 | 30 |
| after 150 hrs ATC | 6 | 11 | 18 | 28 |
| COOH content (meq/kg) | | | | |
| as molded | 29 | 16 | 12 | 10 |
| after 100 hrs ATC | 131 | 12 | — | — |
| after 150 hrs ATC | 205 | 15 | 35 | 16 |
| Mw | | | | |
| as molded | 66500 | 66700 | 66900 | 71700 |
| after 100 hrs ATC | 24300 | 65200 | — | — |
| after 150 hrs ATC | 18400 | 63700 | 46800 | 68600 |

ATC autoclaving at 120° C., relative humidity of 100% and pressure of 1.2 bar
MPa - Mega Pascal
kJ/m$^2$ - kilo Joule per square meter
meq/kg - milliequivalent per kilogram As can be seen from the Examples, the composition of this invention has greatly improved hydrolytic stability (Example 4) in comparison to compositions containing other epoxies (Examples 2 and 3) and a composition containing no epoxy (Example 1). Also note that even at 150 hours of autoclaving, the hydrolytic stability as shown by the properties profile is still overall greatly improved from the control Examples 1–3.

What is claimed is:

1. A thermoplastic resin composition having improved hydrolytic stability comprising in admixture (a) a saturated polyester resin;
   (b) an epoxy novolac compound selected from the group consisting of ortho cresol novolac, epoxy para cresol novolac, epoxy phenol novolac and blends thereof;
   (c) glass fiber reinforcing filler; and
   (d) a catalyst wherein said catalyst is a salt free from direct carbon-phosphorous bonds and contains at least one ion selected from the group consisting of alkali metal cations, alkaline earth metal cations and halide anions.

2. A method for improving the hydrolytic stability of a thermoplastic polyester resin composition comprising compounding (a) a polyester resin, (b) an effective amount of a glass fiber reinforcing filler, (c) an effective amount of an epoxy novolac and (d) an effective amount of a catalyst.

3. A composition as defined in claim 1 wherein (a) the saturated polyester is present in an amount ranging from about 15 to about 80 percent by weight, (b) the glass fiber reinforcing filler is present in an amount ranging from about 5 to about 50 percent by weight, (c) the epoxy novolac is present in an amount ranging from about 0.01 to about 30 percent by weight, and (d) the catalyst is present in an amount ranging from about 0.01 to about 5 percent by weight.

4. A composition as defined in claim 3 wherein said polyester resin is selected from the group consisting of poly(1,4-butylene) terephthalate, polyethylene terephthalate, poly(1,4-cyclohexane-dimethanol) terephthalate and blends of any of the foregoing.

5. A composition as defined in claim 4 wherein the epoxy novolac compound is an epoxy ortho cresol novolac.

6. A composition as defined in claim 5 wherein the catalyst is sodium stearate.

7. A composition as defined in claim 6 wherein said composition further comprises an impact modifier additive.

8. The composition as defined in claim 7 wherein the impact modifier additive is present in an amount ranging from 5 to about 30 percent by weight.

9. The composition as defined in claim 8 wherein the impact modifier additive is a styrene (ethylene-butylene) styrene block copolymer.

* * * * *